Nov. 7, 1967    W. L. HUCK    3,351,384
CHAFF TRAILER

Filed Aug. 9, 1965    2 Sheets-Sheet 1

INVENTOR.
W. Lee Huck.
BY
Edward Finley Bishop
ATTORNEY

Nov. 7, 1967 W. L. HUCK 3,351,384
CHAFF TRAILER
Filed Aug. 9, 1965 2 Sheets-Sheet 2

INVENTOR.
W. Lee Huck
BY
ATTORNEY

United States Patent Office 3,351,384
Patented Nov. 7, 1967

3,351,384
CHAFF TRAILER
William Lee Huck, Box 940, Claresholm,
Alberta, Canada
Filed Aug. 9, 1965, Ser. No. 478,089
1 Claim. (Cl. 298—26)

This invention relates to devices for receiving chaff from an agricultural implement and for depositing such chaff in piles on the ground.

It is known that the chaff from agricultural implements such as combines and the like has value as a food product and that it is desirable to collect the chaff so that it may be transported easily to a storage location.

Further, the chaff contains weed and other seeds and it is advantageous to not blow the weed and other seeds over the surface of the ground behind a combine or other agricultural implement where such weed and other seeds can germinate the following year.

I am aware that it is not uncommon to provide some form of trailer that may be hauled behind a combine and into which the chaff may be blown. I am also aware that it is known to provide the trailer body so that it may be tilted rearwardly to discharge the chaff into a pile on the ground. The difficulty with these prior arrangements however has been that the entire trailer body must be tilted and to accomplish this requires complicated and large mechanisms.

Moreover, to effect a foolproof tilting mechanism for an entire trailer body loaded with chaff it is usually necessary to resort to some form of mechanical aid for tilting the body and for bringing the body back to its level position.

The essence of my invention is to provide a chaff trailer comprising a wheeled box wherein the floor is tiltable about a transverse axis to discharge at the rear of the trailer and wherein the floor is interconnected to the rear end gate of the trailer box and counter balanced therewith so that tilting of the floor will raise the rear end gate of the trailer box to allow the chaff to be discharged onto the surface of the ground and, when the chaff is discharged, the rear end gate of the trailer box will be of greater weight than the floor and will return to the closed position to raise the floor to the level position. Means also is provided to lock the floor of the trailer in the raised and lowered position and there is provided manually operable mechanisms for disengaging the locking means.

In drawings illustrating a preferred embodiment:

Figure 1:
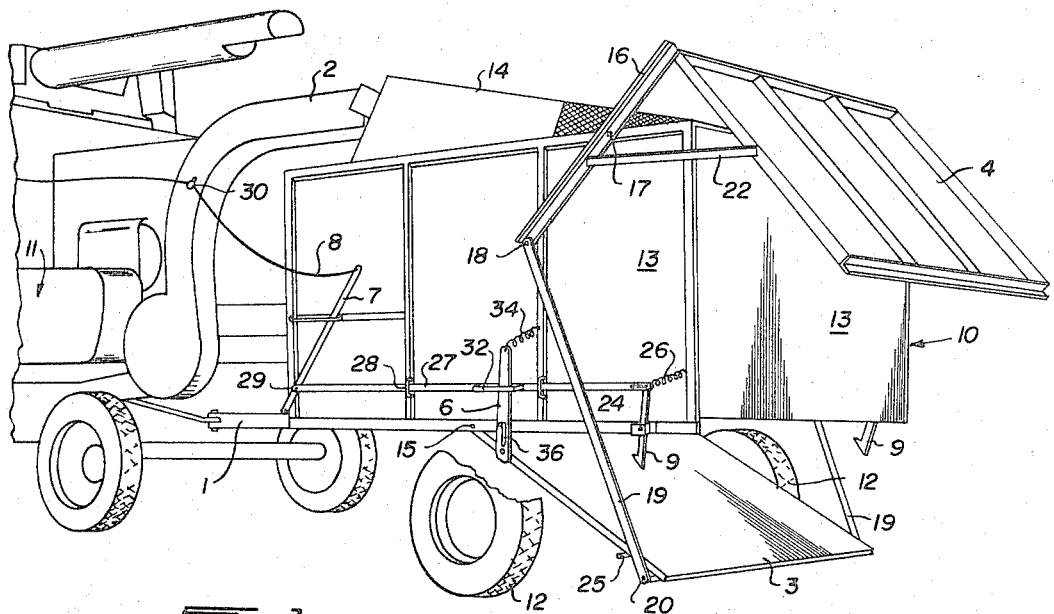
FIGURE 1 is a perspective view of a trailer constructed in accordance with my invention and with the floor in the lowered position and the end gate in the raised position.
Figure 2:
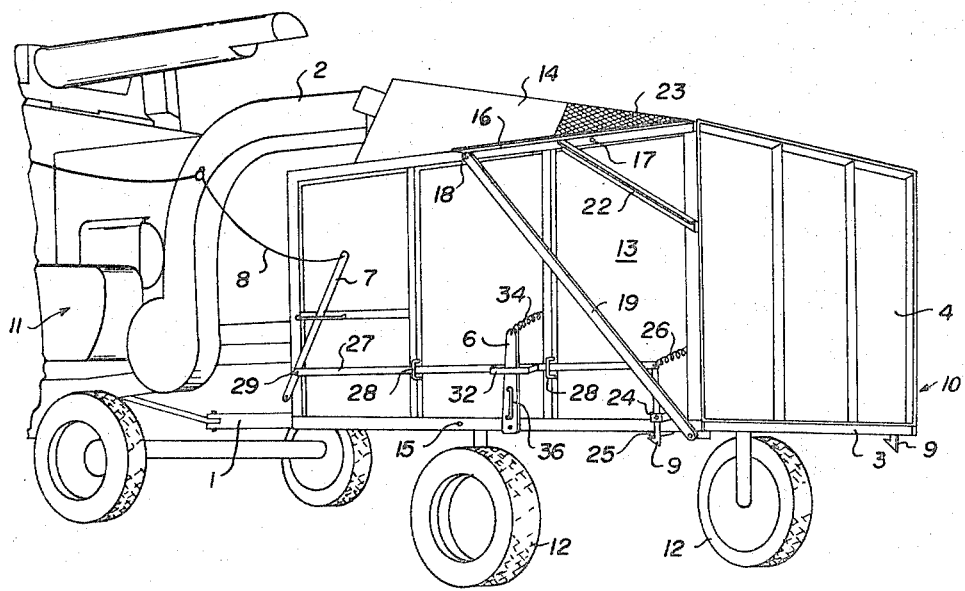
FIGURE 2 is another isometric view with the floor and end gate in the closed position.
Figure 3:
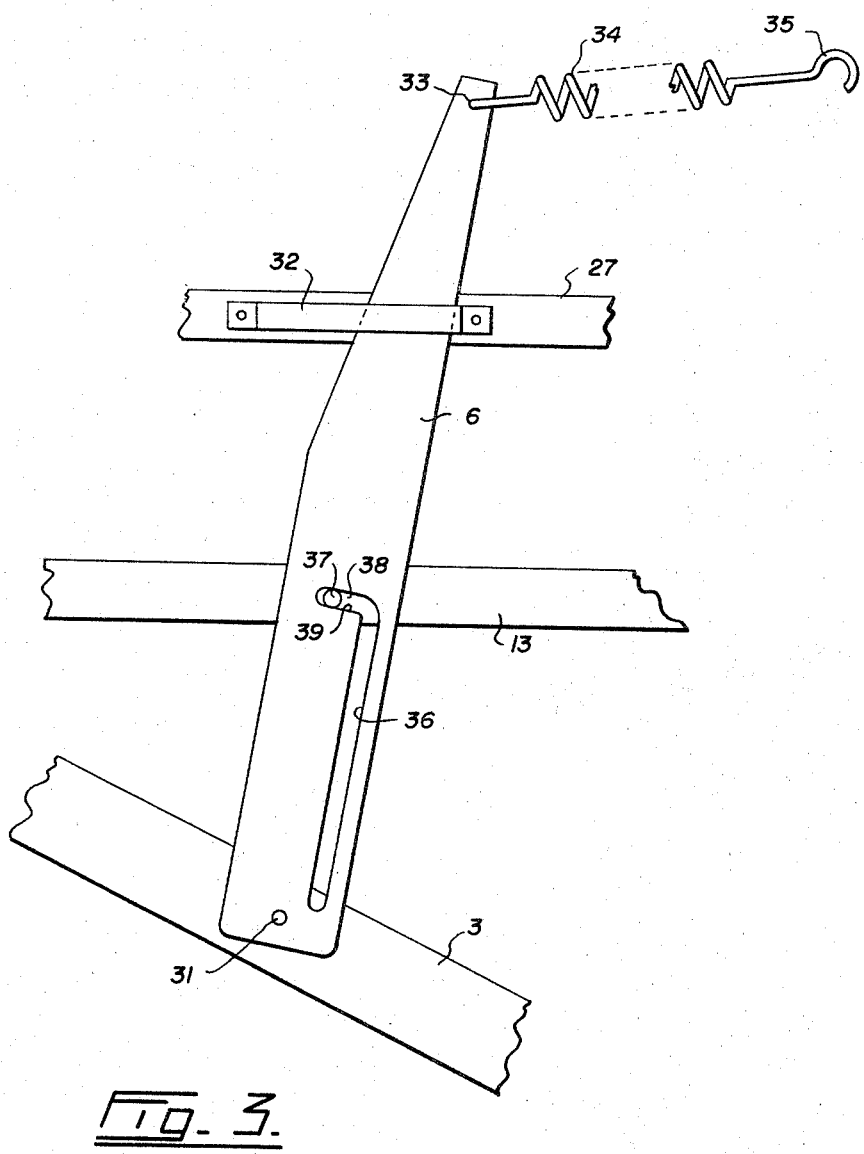
FIGURE 3 is an enlarged broken away view illustrating the locking mechanism for the trailer floor.

As seen in the drawings my invention consists of a trailer indicated generally at 10 interconnected through a drawbar 1 to the combine indicated generally at 11. The trailer 10 is mounted on wheels 12 and consists of fixed vertical sides 13, a front (not illustrated), a top 14, a movable floor 3 and a rear end gate 4. The floor 3 is tiltable on a transverse axis 15 while the rear end gate 4 is constructed with arms 16 which are connected at one end and project from the upper corners of the rear gate and are connected pivotally as at 17 part way along their length to opposite sides of the trailer. At their opposite ends the arms 16 are each connected pivotally as indicated at 18 to one end of a link 19 positioned on opposite sides of the trailer. The links 19 are connected pivotally at their opposite ends adjacent the rearward end 21 of the floor 3. Bracing members 22 are provided between the rear gate 4 and the arms 16 to ensure adequate support for the end gate 4.

The top 14 of the trailer is inclined upwardly from the rear of the trailer towards the front and is open at its front end to receive chaff or other materials from the discharge 2 of the combine 11. Adajcent the rearward end of the trailer the top 2 is formed with a mesh 23 to allow dust and other unwanted material to escape as chaff is blown into the trailer.

The floor 3 of the trailer is maintained in the up position by the catches 9 which are pivotally connected at 25 to the trailer on opposite sides thereof to engage with pins 25 which project from the sides of the floor 3. The catches 9 are biased into automatic engagement with the projections 25 by springs 26 connected from the catches 9 to the sides of the trailer. The catches 9 are moved to release the projection 25 to allow the floor 3 to drop about its transverse axis 15 by actuating rods 27 which are contained slidably against the sides of the trailer by the containers 28. While only one such actuating bar 27 is illustrated it would be obvious that a second is provided on the opposite side of the trailer. The actuating bars 27 are moved by the lever 7 which is connected pivotally at 29 to the one bar and interconnected with the bars 27 on the opposite side of the trailer. An actuating rope 8 passes through the guide pulley 30 and terminates at the forward end of the combine adjacent the operator.

The floor 3 is maintained in the lowered position indicated in FIGURE 1 by the arms 6 connected pivotally at their lower ends to opposite sides of the floor 3 and contained in sliding relation to the actuating bars 27 through containers 32. At their upper ends, the arms 6 each are connected at 33 to springs 34 which are secured at 35 to the sides of the trailer. Each arm 6 is provided with a slot 36 to engage slidably with a pin 37 projecting from the side of the trailer. The pins 37 are arranged to move into and engage in the angular portions 38 of the slots 36 in the arm 6.

In operation and with the bottom 3 of the trailer raised and locked in position by the catches 9 engaging on the pins 25, chaff may be blown from the blower 2 into the trailer. When the trailer is filled and it is desired to discharge the chaff, the operator will pull the rope 8 to move the actuating bars 27 and release the catches 9 from the pins 25.

It is important that the transverse pivot of the floor 3 be located forwardly of the transverse center of the floor. This will weight the floor 3 towards the rear so that immediately the catches 9 are released from the pins 25, any weight of chaff within the trailer will tilt the rear of the floor 3 downwardly at the rear, as indicated in FIGURE 1 in the drawings.

Through the interconnection of the arms 19 and 17, the movement of the floor 3 downwardly will raise the end gate 4 as indicated and the chaff within the trailer will be allowed to slide off the floor 3 onto the ground. When the floor 3 moves down to the position indicated in FIGURE 1, the arm 6 will also move downwardly and the slots 36 will obviously move over the pins 37. At the end of each slot 36, the pin will reach the angular portion 38 and the spring 34 will move the arms 6 to bring the portions 38 over the pins. The pins 37 will then engage on the shoulders 39 of the portions 38 and the floor 3 effectively will be locked in the lowered position.

When it is desired to raise the floor 3, the cable 8 is again tripped to move the levers 7 and the actuating bars 27. This will move the arms 6 to move the portions 36 away from the pins 37 and allow the floor 3 to rise. The floor 3 will rise automatically owing to the fact that the gate 4 is constructed to be heavier than the floor and when the gate 4 falls by gravity the floor 3 will be raised automatically.

What I claim as my invention is:

A chaff trailer, comprising, in combination:

a wheeled container having fixed sides and a front;

a rear end gate pivotally connected with the fixed sides;

a floor tiltable, about a transverse axis located between the front and rear end gate, between a lowered tilted position and a raised level position;

linkage means interconnecting the floor and the end gate whereby downward tilting of the floor will cause raising of the rear end gate about the pivot and lowering of the rear end gate about the pivot will cause upward movement of the floor;

the weight of the rear end gate being sufficient to raise the floor to the level position; and locking means adapted to lock the floor in the raised and lowered positions, said raised position locking means comprising;

at least one catch, pivotally mounted on the container and adapted to engage with the floor to lock it in the raised position;

means for normally biasing the catches into the locking position; and means, operable from the front of the container, for releasing the catches;

and said lower position locking means comprising;

an arm, pivotally connected at its lower end to one side of the floor, said arm defining a slot therein having an angular portion at its upper end;

a pin, projecting from the adjacent side of the container, engaging the slot;

spring means, connected to the upper end of the arm, adapted to urge the pin into the angular portion of the slot when the floor is in the lowered position;

and means, connected to the arm, adapted to cause the pin to be moved out of the angular portion of the slot whereby the floor may move from the lowered to the raised position.

References Cited

UNITED STATES PATENTS

| 1,296,562 | 3/1919 | Schaegel | 298—26 |
| 1,523,525 | 1/1925 | Hatashita. | |
| 3,034,832 | 5/1962 | Barrington | 298—26 |
| 3,215,291 | 11/1965 | Nickla. | |

BENJAMIN HERSH, *Primary Examiner.*

RICHARD J. JOHNSON, *Examiner.*